United States Patent [19]

Milants

[11] 4,166,593
[45] Sep. 4, 1979

[54] CASSETTE HOUSING WITH INTEGRAL TAPE GUIDE

[75] Inventor: Lodewijk L. Milants, Eindhoven, Netherlands

[73] Assignee: U.S. Philips Corporation, New York, N.Y.

[21] Appl. No.: 873,139

[22] Filed: Jan. 30, 1978

[30] Foreign Application Priority Data

Jan. 31, 1977 [NL] Netherlands .......................... 7700972

[51] Int. Cl.² .............................................. G03B 1/04
[52] U.S. Cl. ................................................... 242/199
[58] Field of Search ............... 242/55.19 A, 197-200; 360/96, 132; 352/72-78 R

[56] References Cited

U.S. PATENT DOCUMENTS

| | | | |
|---|---|---|---|
| 3,751,043 | 8/1973 | Bracci | 242/199 |
| 3,848,245 | 11/1974 | Biery et al. | 360/132 |
| 3,934,842 | 1/1976 | Posso | 242/199 |
| 3,991,956 | 11/1976 | Machida | 242/199 |

*Primary Examiner*—Leonard D. Christian
*Attorney, Agent, or Firm*—David R. Treacy

[57] ABSTRACT

Housing for a magnetic tape cassette, and method of molding such a cassette. The housing is made from a molded plastic lower part and a molded plastic cover, the lower part including a tape guide unit extending between two true cylindrical tape guides and integral with the cassette locating surfaces.

3 Claims, 3 Drawing Figures

CASSETTE HOUSING WITH INTEGRAL TAPE GUIDE

BACKGROUND OF THE INVENTION

1. Field of the Invention

The invention relates to cassettes for magnetic tape used for recording and playback of information; and more particularly, to such cassettes having guides for maintaining accurate angular alignment of tape passing an open front region through which a magnetic head passes to contact to the tape, and to a method of manufacturing such a cassette.

Cassettes of this general type are used on a large scale in apparatus for many uses, both in the consumer goods sector and for professional and business activity. A particular style of cassette with which the invention is especially useful is commonly known as the "compact cassette," "standard cassette" or "Philips cassette;" external dimensions and preformance characteristics of these cassettes are standardized through adherence to International Electrotechnical Commission publication no. 94A. This cassette has established "support planes" defined by locating surfaces, from which critical dimensions for tape alignment are measured. Therefore, when designing high quality cassette apparatus, such as a high-fidelity audio recording and/or playback machine, customarily referred to as a tape recorder, for optimum results the recording/playback head is located accurately with respect to mounting surfaces which engage these locating surfaces.

When relatively high frequencies are to be handled by a tape recorder, it is critical that the tape runs exactly perpendicular to the gap in the magnetic head. Deviation from perfect perpendicularity produces what is called, in professional jargon, azimuth error. In the case of the compact cassette, this error is observed as the result of misalignment between tape guides located inside the cassette, over which tape is stretched as it passes the openings of the front wall region, and locating surfaces on the lower exterior of the cassette housing. Of course, when the cassette is turned over to play or record the other tracks on the same run of tape, the locating surfaces for what had been the top of the cassette now become the reference points for establishing the support planes.

Because of the vast quantities of compact cassettes which are made and sold, economy of construction is maximized wherever possible. This goal has dictated, for example, the use of relatively inexpensive low rigidity plastic materials for the cassette housing, which materials can usually be molded to produce interlocking shapes. As a result of this material choice, and the preference for simplest possible molds, azimuth error is an important source of limitation on the high frequency response of the cassette.

2. Description of the Prior Art

The original compact cassette is described in U.S. Pat. No. 3,394,899 and uses a housing made of two identical halves, each including one pair of locating surfaces and half of the guide surfaces. Each half is box-shaped and has a bottom with openings for the passage of reel drive spindles, cassette positioning pins, and a drive capstan. Each housing half has half-height side and rear walls. Along the front edge or wall a number of openings are produced, for the heads and pressure rollers to pass through.

To guide a tape passing by the front openings, a tape guide unit must be provided. In the conventional two-part cassette housing, half-height guides project substantially transversely to the bottom (and the cover, which is simply "the bottom" of another half turned upside down). However, when molding such a housing half it is necessary to provide a taper or "draft" in those parts which extends substantially in the direction in which the mold is opened, so that the housings can be removed easily. Because of this draft the tape guides are not true cylindrical surfaces about axes perpendicular to the support planes of the cassette, but have more of a conical shape. Azimuth errors of plus or minus three minutes of arc are inevitable with this style of construction.

In contradistinction to the conventional construction described above, U.S. Pat. No. 3,934,842 teaches a three-part housing, also made of moldable plastic parts. In this cassette the tape guide unit is a separate molding which can be made from a plastic having desirable low-friction properties. Further the tape guide unit is molded with the mold interface perpendicular to the bottom cassette wall, so that the sliding surfaces provided for tape guiding can be theoretically perpendicular to the support planes. This separate guide unit is then mounted in the box-shaped cassette part. However, the accuracy depends on the cumulative dimensional tolerances of the box-shaped outer part and the tape guide unit, and also on the tolerances observed in assembly per se. Moreover, the top and the bottom of the guide unit each are tapered to provide draft, so that these surfaces by which the tape guide unit is mounted in the cassette may again provide an oblique relationship of the tape guides relative to the bottom of the box-shaped part. This construction also has the disadvantage that rigidity of the cassette housing is necessarily reduced by making the assembly from three parts.

A further feature of the cassette described in U.S. Pat. No. 3,934,842 is that all the surfaces in the region projecting forward from the tape guide depend from the cover. This prevents use of identical upper and lower halves, but enables easy threading of the tape onto the lower housing when the cassette is being assembled, the cover being attached last and partially enclosing the front.

Still another construction and related manufacturing method for cassettes is known in the field of so-called professional or digital cassettes. These cassettes utilize a metal cassette frame, which constitutes the tape guide unit and the side walls of the cassette housing; and two thin plastic covers which are mounted on the upper and lower sides of the metal frame. Such cassettes have been available since approximately 1971; for example, under the designation Philips model LGH 6003 or LGH 6005. The metal frame of this three-part cassette is cast in a composite mold having a movable third mold section which can form cassette guiding surfaces which are true cylinders perpendicular to the support planes. As a result of this high quality and expensive construction these professional cassettes provide correct tape guidance with only a very small tolerance on the azimuth angle, and are quite rigid. This rigidity is obtained almost entirely from the rigidity of the metal frame, the covers being comparatively thin and readily deformable. These professional cassettes are not readily suited for use in consumer equipment, however, because there is no provision for the break-away tabs in the rear wall (opposite to the front wall opening through which heads enter) which are used to code the type of tape used in the cassette, or whether or not the cassette is pre-recorded. Many consumer-type cassette apparatus contain sensors for detecting the presence or absence of such tabs, so as to inhibit erasing of pre-recorded tape, or to change the bias current used for recording to match most closely the properties of the magnetic tape with which the cassette has been loaded. Further, such code openings or tabs cannot be readily provided in the rear wall of a cassette housing utilizing the professional cassette style metal frame. Because the frame is essentially a hollow ring, the provision of such an opening would lead to an unacceptable localized reduction in strength, and might even seriously impair its structural integrity.

SUMMARY OF THE INVENTION

An object of the invention is to provide a magnetic tape cassette whose housing can be molded entirely from plastic materials and yet maintain azimuth angular error less than approximately one minute of arc, so that accurate recording and playback of information at frequencies between 15 and 20 kHz is possible.

A further object of the invention is to provide a housing for a magnetic tape cassette having only two major parts and having high rigidity.

Yet another object of the invention is to provide tape guides in a cassette perpendicular to the support planes at the same time that the cassette has provision for coding tabs and openings at the rear without an increase of overall dimensions.

Still another object of the invention is to provide an economical method of producing high quality cassettes by plastic molding.

According to the invention, a housing for a magnetic tape cassette consists of a lower part and a cover only, a tape guide unit of the cassette being a continuous section of material extending between two true cylindrical guides, formed as a unitary element with the cassette locating surfaces and the lower part.

In a preferred embodiment of the invention, the tape guides of the unitary element have upper and lower shoulders for vertical positioning of tape passing over the guides, these shoulders lying in planes parallel to the support planes for the cassette.

According to yet another aspect of the invention, in a method of manufacturing a housing for a magnetic tape cassette a unitary part having a box-shaped portion and a tape guide unit is formed from plastic material introduced into a mold having first, second and third sections, the first and second sections forming the external bottom surfaces and opposed internal surfaces of the lower parts respectively, these sections being movable with respect to each other in a first direction generally perpendicular to the bottom surface, the third section forming true cylindrical tape guiding surfaces on the guide unit perpendicular to planes of the cassette locating surfaces, the third section being movable in a direction perpendicular to the first direction.

The invention will be described in greater detail hereinafter with reference to a preferred embodiment shown in the drawing.

DESCRIPTION OF THE PREFERRED EMBODIMENT

Figure 1:
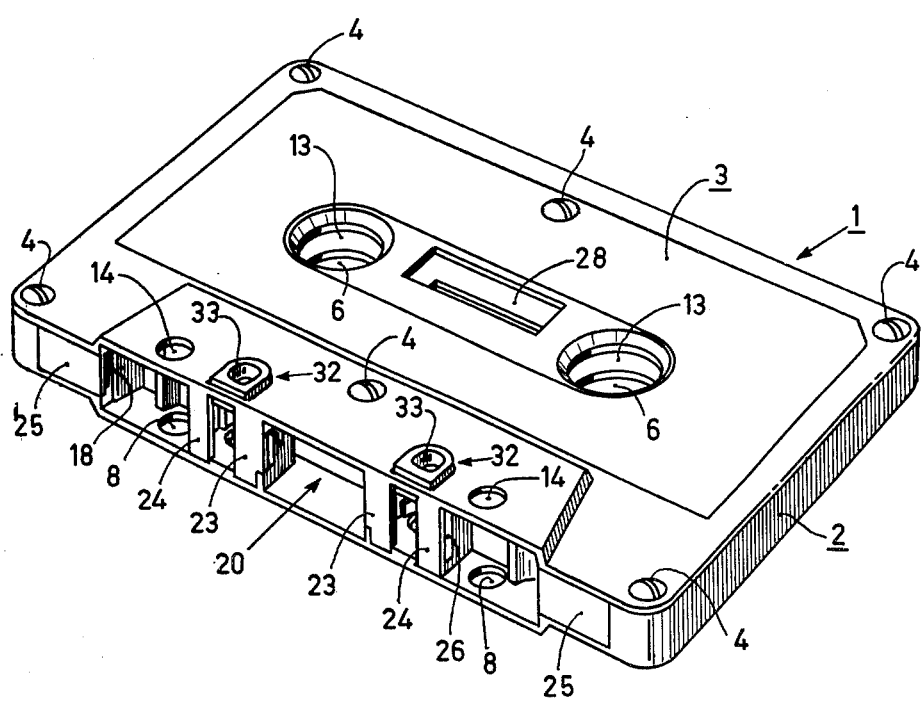
FIG. 1 is a perspective view of an assembled cassette housing in accordance with the invention.

In FIG. 1 an assembled cassette housing is shown, but without tape, tape reels or the pressure pad assembly that normally are installed before the housing is closed. The housing 1 is made from a box-shaped lower part 2 and a cover 3 which fits over the lower part and is secured to it by a number of screws 4. The lower part 2 is shown in more detail in FIG. 2, and includes a bottom 5 substantially flat on its interior and having openings 6 formed in the bottom for reel drive spindles to pass, openings 7 for cassette guide pins or other positioning devices, and openings 8 for a tape drive capstan to pass through. Extending upwardly from the bottom are a right side wall 9 and left side wall 10, a rear wall 11 and a front wall 12 which is almost completely open for the passage of magnetic heads and a pressure roller.

Figure 2:
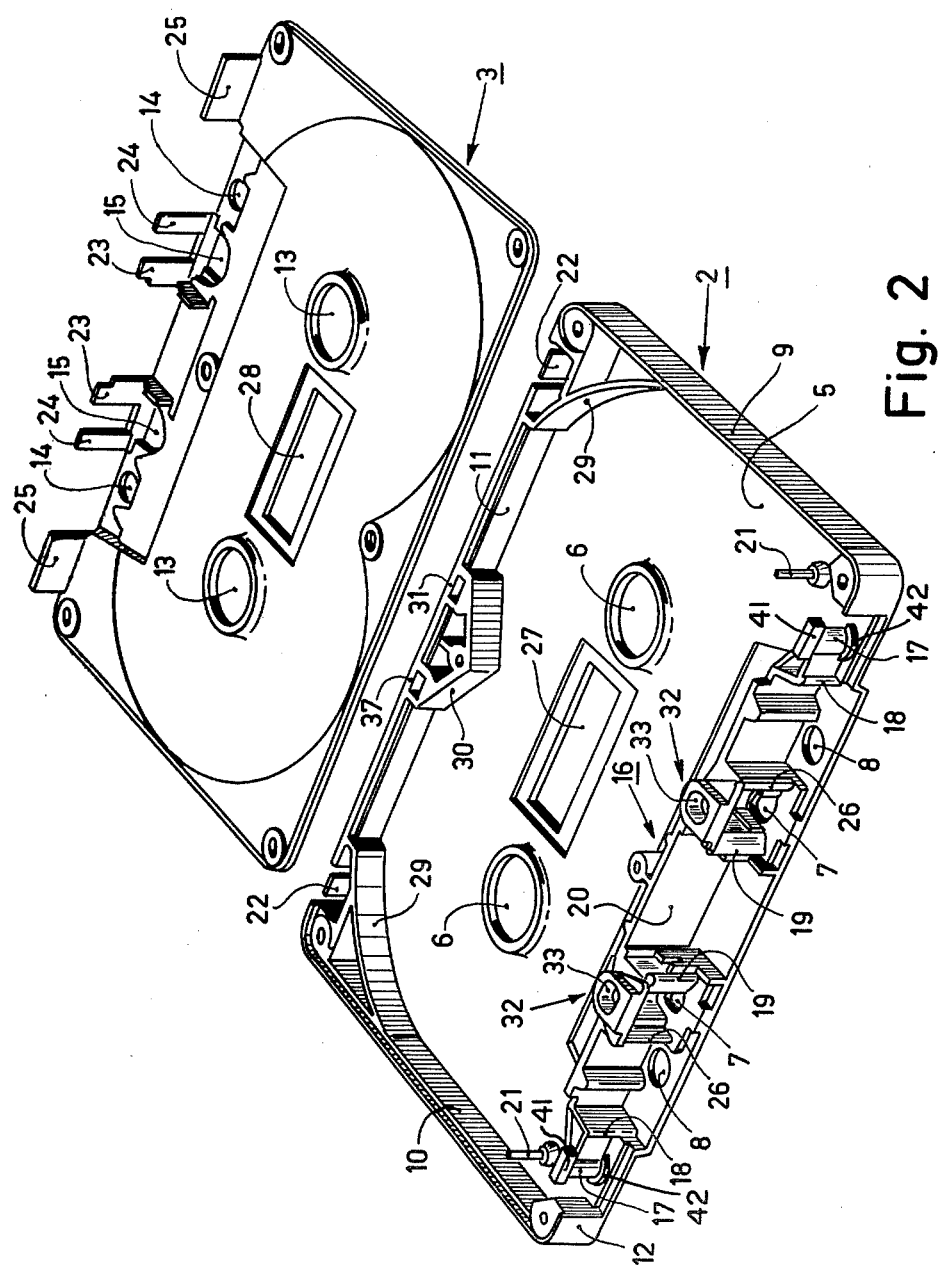
FIG. 2 is a perspective view of the lower part and cover respective of the housinh of FIG. 1, the cover being turned upside down to show its interior.

In FIG. 2 the cover 3 is also shown turned over with its rear edge adjacent the rear wall 11 of the lower part. Openings having functions corresponding to those described for the lower part are located at mirror image positions as shown in FIG. 2; for example, the reel drive spindle openings 13 which correspond to the lower part openings 6, and the capstan openings 14 corresponding to the openings 8. Openings 15 are also provided at locations generally corresponding to the cassette guide pin openings 7 in the lower part 2 but having, as will be described hereinafter, a different shape.

Also extending upward from the bottom of the lower part 2 near the front wall 12 is a tape guide unit 16 generally parallel to the front wall and having a height corresponding to the interior distance between the bottom 5 and the cassette cover 3 when the housing is assembled, for example as shown in FIG. 1. The tape guide unit 16 has a comparatively complex structure and performs several functions. Two projecting tape guides 17 are located at the extreme ends of the tape guide unit, and other symmetrically located tape guides 18, 19 and 26 are located at intermediate positions between the guides 17. The far guides 17 have a generally rounded shape perpendicular to the bottom 5, and upper shoulders 41 and lower shoulders 42 generally parallel to the bottom 5; and are symmetrically located about and adjacent a central recess 20 into which in normal operation a recording/playback head of a recorder apparatus passes. The recess 20 is designed to accommodate, in the usual fashion known in the art, means for holding the tape properly and resiliently against the head, such as a resilient bracket having a pressure pad and a metal screening bracket. For clarity in description of the lower part itself, these well-known components are not shown in the drawing.

Also projecting perpendicularly upward from the bottom are two pins 21 which function as bearing spindles for tape guide rollers commonly used to reduce friction and the variation of friction as a function of the amount of tape being wound on or off the adjacent reel. Also projecting upward from the bottom 5, in line with the rear wall 11, are two break-away tabs 22 at the standardized locations used to indicate whether or not a cassette contains pre-recorded tape.

The cover 3 also includes front lugs 23, 24 and 25 symmetrically disposed about the front to rear center line of the cover, so located that when the cover is mounted as shown in FIG. 1 the lugs partly close off the otherwise largely open front wall 12 so as to protect magnetic tape passing over the tape guides behind the front wall opening. As will be clear to one of ordinary skill in the art, when a complete cassette using this housing is assembled, the magnetic tape would be contained on reels concentric with the openings 6 and 13, a run of the tape extending from one reel to the other and passing in front of the tape guide unit 16. Mirror image rectangular openings 27 and 28 are formed in the bottom 5 of the lower part and in the cover 3 respectively, in which transparent windows can be glued so that the edges of the magnetic tape contained on reels in the cassette can be observed.

The external dimensions and details of the assembled housing are conventional and so are not further described here. The details will correspond, for example, to IEC publication no. 94A referred to previously. However, unlike the cassette described in U.S. Pat. No. 3,934,842 the guiding surfaces of the tape guides 17, 18, 19 and 26 are cylindrical surfaces and are exactly perpendicular to the adjacent portions of the bottom 5, this perpendicularity dependent entirely on the molds used for forming the lower part 2 and not adversely affected by subsequent mounting and assembly operations.

To stiffen the housing generally reinforcement ridges 29 are provided in the otherwise unused space at each of the rear corners, and a reinforcement member 30 projects upwardly from the bottom and forwardly from the rear wall generally between the spaces that would subsequently be occupied by the two tape reels. Further, to indicate the use of special tape in a housing, for example chromium dioxide magnetic tape, additional openings can be formed in the rear wall 11 at the locations 31 without significantly affecting the rigidity and structural integrity of the box-shaped lower part 2 because the entire rear wall 11, ridge 29 and reinforcement 30 form part of one unitary molding with the bottom 5. This basic rigidity combined with the special rigidity provided by the integral tape guide unit 16 leads to another reduction of tolerance build-up. The external surface of the bottom 5 immediately adjoining the guide pin openings 7 serves as a cassette locating surface when the cassette is installed with the cover uppermost on a conventional apparatus. The guide unit 16 also includes cassette positioning members 32 facing away from the bottom 5, and having guide pin openings 33 corresponding to the openings 7 at the bottom surface. The members 32 are so arranged that, when the housing is fully assembled, the top surfaces of the members 32 project through the openings 15 of the cassette cover to provide cassette locating surfaces used when the cassette is being played in the inverted, or cover down position.

As a result of this configuration, the tape guide unit 16 which extends continuously between the two far tape guides 17 functions like a beam which reinforces the bottom 5 so that the lower part 2 has a very high rigidity even though its front wall is almost completely open. Further, both the upper and lower locating surfaces and guide pin openings are formed in the tape guide unit or surfaces of the bottom which are integral with and immediately below the tape guide unit.

The pair of far tape guides 17 are formed with upper and lower shoulders 41 and 42 lying in planes parallel to each other and to planes passing through the cassette locating surfaces of the bottom 5 adjoining the openings 7 and of the positioning members 32. Therefore azimuth error is minimized because the critical tape positioning is performed by surfaces within the cassette housing that are a portion of the most rigid part of the housing and are close to and rigidly spaced with respect to the cassette locating surfaces, although the cassette housing has only required two elements.

Figure 3:
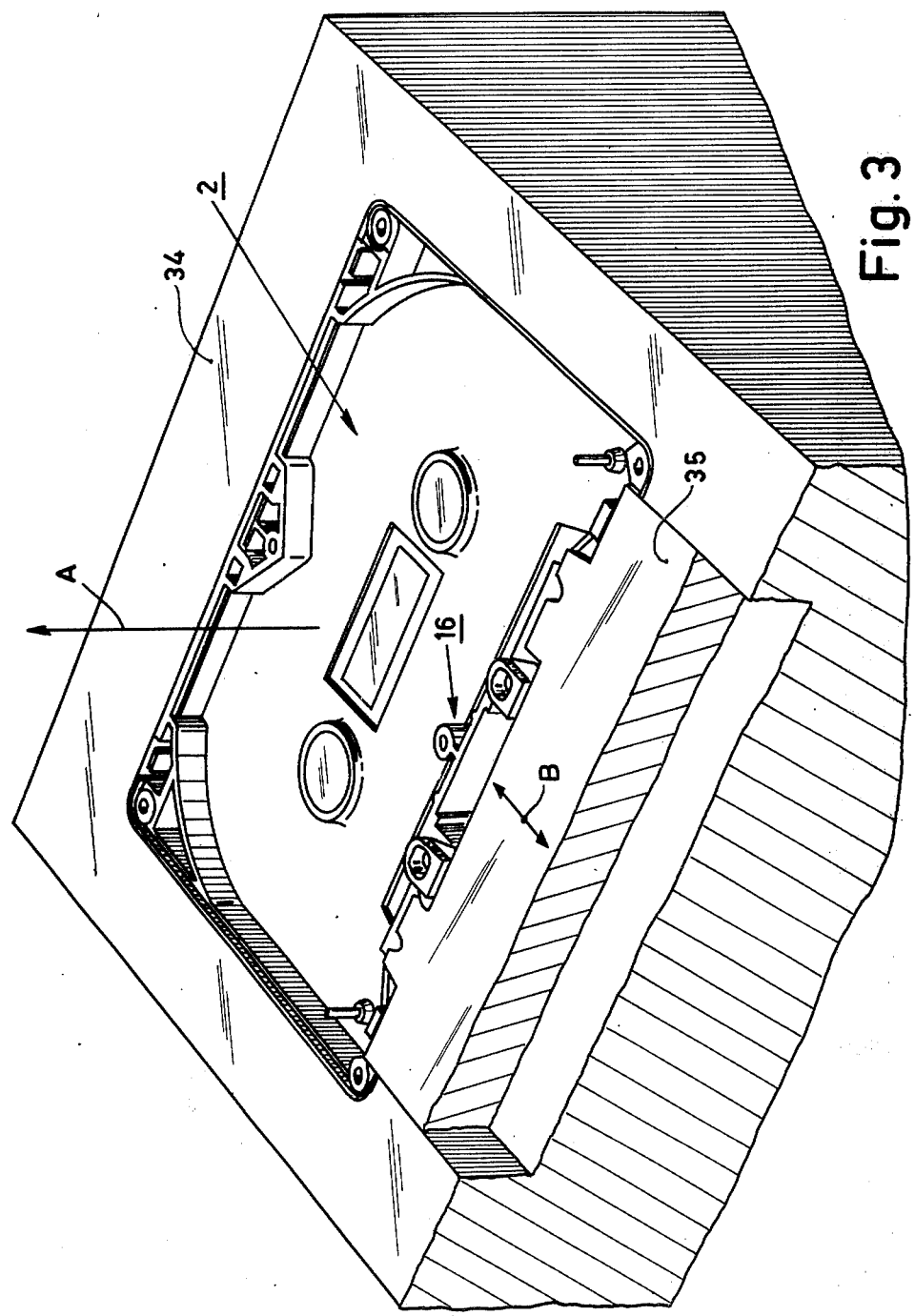
FIG. 3 is a schematic view of a mold for forming the lower housing part, with the upper mold section removed.

A mold used in the method according to the invention is shown schematically in FIG. 3. The mold consists essentially of a first or lower mold section 34, a second or upper mold section (not shown) movable with respect to the first mold section in the direction of the arrow A, and a third or sliding mold section 35 mounted in the lower mold section 34 so as to be slidable between the molding position shown in FIG. 3 and a retracted or release position by movement in the direction of the double arrow B perpendicular to the direction of the arrow A. A lower part 2 is shown still in the lower section 34, exposing the internal surfaces of the bottom of the cassette and the co-planar cassette upper locating surfaces which were formed by complementary surfaces of the second mold section. The third, sliding mold section 35 contains the complementary surfaces for forming the cylindrical tape guide surfaces as true cylindrical surfaces perpendicular to the planes of the locating surfaces, and the shoulders of the far tape guides 17, removal of the lower part being possible only after the second section 35 has been slid away from the molded lower part.

By the use of such a mold a lower cassette part can be obtained which, in the assembled cassette, will provide an azimuth error of less than one minute of arc.

It will be clear to those of ordinary skill in the art that many other variations and embodiments are possible within the spirit of the invention. The cover and lower part need not be molded from the same homogenous material, although it would be desirable that they have similar temperature coefficients of expansion. By selection of the relative locations of the tape guides, so that some upwardly extending front lugs can be part of the lower part, yet permit withdrawing the third mold section, the cover can be made as a substantially flat unit. Also, it may be possible to simplify the pressure pad arrangement by molding resilient elements into the front central recess. These and other variations are made possible by the basic invention without losing the advantage or rigidity, low azimuth error, and relatively low cost.

Further, the invention may be practiced using any moldable material. For example instead of the usual polystyrol, an especially stable plastic may be chosen such as an acrylonitrile reinforced with glass fibres or glass pellets.

I claim:
1. A housing for a magnetic tape cassette consisting of a lower part and a cover,
   the lower part being a unitary mass of synthetic resin material having a bottom, a rear wall and two side walls extending upwardly generally perpendicular to the bottom, at least two cassette locating surfaces on the exterior of the bottom, and a tape guide unit.
   the tape guide unit being a continuous section of material extending between and including two true cylindrical tape guides, said tape guides having upper and lower shoulders for vertical positioning of tape passing over the guides, said section also including two upper cassette locating surfaces, said upper and lower locating surfaces defining upper and lower support planes repectively, parallel to each other, said upper and lower shoulders lying in respective planes parallel to said support planes.

2. A housing as claimed in claim 1 wherein the said lower part is open along a front wall region, all front surfaces of said tape guide unit being disposed within a rearward projection of said open front wall region, and said cover has at least two openings therethrough, the upper cassette locating surfaces of the tape guide unit projecting through respective openings.

3. A housing as claimed in claim 1 having an azimuth angle error of tape guidance less than one minute of arc.

* * * * *